Patented Sept. 18, 1945

2,385,104

UNITED STATES PATENT OFFICE 2,385,104

ALKAMINE DERIVATIVES OF ETHERS OF P-HYDROXYMETHYL BENZOIC ACID

Victor S. Salvin, Cumberland, Md., and Arthur J. Hill, New Haven, Conn., assignors to American Cyanamid Company, New York, N. Y., a corporation of Maine No Drawing. Application April 16, 1942,
Serial No. 439,235

12 Claims. (Cl. 260—472)

This invention relates to alkamine esters of p-alkamine alkoxymethylbenzoic acid.

According to the present invention it has been found that a new series of alkamine ether esters of p-methylbenzoic acids can be prepared, many of which possess important properties as local anesthetics for surface and introcutaneous use.

The esters of the present invention may be represented by the formula:

in which $R_1$ and $R_2$ are the same or different alkamine alkylene groups. The alkamine group may be a secondary or tertiary amine, but the best products for practical use appear to be those in which the alkamine is a tertiary amine which may be represented by the following formula:

in which $Alk_1$ and $Alk_2$ are the same or different alkylene groups and $R_3$, $R_4$, $R_5$ and $R_6$ are the same or different hydrocarbon radicals, or $R_3$ and $R_4$ or $R_5$ and $R_6$ form part of the heterocyclic ring such as morpholine, piperidine and the like.

The present invention is not broadly limited to any particular method of producing the new compounds. However, we have found that the best process involves an alcoholysis of an alkyl ester of p-alkamine alkoxymethylbenzoic acid with the amino alcohol which it is desired to have in the ester portion of the molecule. This amino alcohol may be the same as that used in preparing the alkamine ether group thus producing symmetrical ether esters or it may be different resulting in unsymmetrical ether esters.

The alkyl esters of the alkamine alkoxymethylbenzoic acids are themselves new compounds but are not claimed in the present application, forming the subject matter of our copending application Serial No. 439,234, filed April 16, 1942. They are produced by reacting an alkyl ester of a p-halogen methylbenzoic acid such for instance as p-chlormethylbenzoic acid with an alcoholate of the amino alcohol, the radical of which it is desired to introduce into the ether portion of the molecule.

While the alcoholysis process is preferred and is the only one which is usable in preparing unsymmetrical ether esters, it is possible to produce symmetrical ether esters by reacting p-halogen methylbenzoyl halide with an alcoholate of the desired amino alcohol. The reaction proceeds satisfactorily with either the chloro or bromo compounds and hence the chloro compound, that is to say the p-methylbenzylchloride, is preferred as it is considerably cheaper and the more expensive bromo compound does not usually warrant the additional expense. The invention, however, is in no sense limited to the use of the chloro compounds.

When the alcoholysis method is used, the particular alkyl group in the ester part of the molecule is not important. Alkyl esters of any of the cheap alcohols may be employed as the alcohol is set free and does not enter into the constitution of the final product. For this reason the ethyl esters which are the cheapest to prepare present commercial advantages. Similar results, are however obtained with other esters such as the corresponding propyl and butyl esters.

The amino alcohols which may be used in order to produce various compounds falling under the present invention include the common amino alcohols such as β-diethylaminoethanol, β-diethylaminopropanol, γ-diethylaminopropanol, γ-dibutylaminopropanol, and less common amino alcohols such as dibutylaminobutanols, β,β-phenylethylaminoethanol, β-dipropylaminoethanol, β-morpholinoethanol, β-piperidinoethanol, β-dicyclohexylaminoethanol, β-methylcyclohexylaminoethanol, β-phenylaminoethanol, β,β-dimethyl-γ-piperidinopropanol and the like.

When using the procedure in which an alcoholate of the amino alcohol is reacted with a halogen methylbenzoyl halide, we prefer to use the sodium alcoholate as this is the cheapest to prepare. However, any of the other alcoholates such as those of potassium operate in the same manner, and are included in the invention. Similarly in the alcoholysis procedure it is desirable to catalyze the alcoholysis by the presence of a small amount of a metal alcoholate and for this purpose sodium may be used and is preferred because of its cheapness, but similar results are obtained with other metal alcoholates and the choice of sodium is purely a matter of economics.

The invention will be described in greater detail in conjunction with the following specific examples, the parts being by weight.

Example 1

γ-Diethylaminopropyl-p-β-diethylamino-Ethoxymethyl benzoate
CH₃OCH₂—CH₂—N(C₂H₅)₂

COOCH₂—CH₂—CH₂—N(C₂H₅)₂

100 parts of the ethyl ester of p-β-diethylaminoethoxymethyl benzoic acid are mixed with 160 parts of γ-diethylaminopropanol in which 1 part of sodium had been dissolved as a catalytic agent. The alcoholysis mixture is then heated to 150° C. and maintained at this temperature until the reaction is complete. The excess amino alcohol is then removed by distillation under reduced pressure, the residue treated with 500 parts of water and the water suspension extracted with ether. After drying the ether extract and removing the ether, the residue is then separated by fractional distillation at reduced pressure (about 4 mm.). The first fraction to come over is some unchanged γ-diethylaminopropanol. This is followed by an intermediate fraction boiling at 175-180° C. which is unchanged ethyl ester and finally the temperature rises sharply to 218-220° C. and a light yellow oil distills over which on redistillation can be brought within a boiling range of 219-221° C. and is the unsymmetrical alkamine ether ester. The ester may be reacted with any suitable acid to form the corresponding water soluble salt which salts are extremely powerful local anesthetics having an activity equal or greater than cocaine but markedly reduced toxicity.

Example 2

β-Diethylaminoethyl-p-γ-diethylamino-Propoxymethyl benzoate
CH₃OCH₂—CH₂—CH₂—N(C₂H₅)₂

COOCH₂—CH₂—N(C₂H₅)₂

1 part of sodium is dissolved in 240 parts of β-diethylaminoethanol and to the mixture is then added 110 parts of ethyl-p-γ-diethylaminopropoxymethyl benzoate. The mixture is then heated to 150° C. and maintained at this temperature for approximately 40 hours. After cooling the reaction mixture is treated with 300 parts of water, extracted with ether, the ether extract dried and the ether removed. The residual liquid is then removed under reduced pressure. At about 70° C. under 20 mm. pressure unchanged β-diethylaminoethanol is recovered, the pressure is then reduced to 3 mm., and the temperature raised to 175-176° C. at which temperature unchanged ethyl - p-γ-diethylaminopropoxymethyl benzoate is recovered. The temperature then rises to 204-207° C. (2-3 mm.) and a yellow oil distills over which is the unsymmetrical ether ester. This ester does not have as great anesthetic activity as that of Example 1.

Example 3

β-Diethylaminoethyl-p-β-diethylamino-Ethoxymethyl benzoate
CH₃OCH₂—CH₂—N(C₂H₅)₂

COOCH₂—CH₂—N(C₂H₅)₂

23 parts of sodium are dissolved in 175 parts of β-diethylaminoethanol and 500 parts of toluene are added. 9.5 parts of p-chloromethyl benzoyl chloride are dissolved in 500 parts of toluene and the solution added very gradually to the alcoholate solution, vigorous stirring being maintained throughout the addition. Immediate reaction is evident with evolution of heat and sodium chloride precipitates as a solid. After all of the p-chlormethyl benzoyl chloride is added, the mixture is stirred and refluxed until no further precipitation of solid takes place.

The reaction mixture is cooled and then extracted with cold dilute hydrochloric acid producing a crude hydrochloride of the ether ester. The acid extract is then treated with solid sodium carbonate liberating unreacted amino alcohol and the ether ester. The solution is extracted with ether and the ether extract dried and the ether removed. The residual extract is then distilled fractionally under pressure.

The first fraction comes over at 54° C. (22 mm.) and is mainly unreacted β-diethylaminoethanol. The pressure is then reduced to 3 mm. and at 199°-202° C. a light yellow oil distills over which is the ether ester and which may be purified if desired by redistillation. The ester in the form of its hydrochloride is a good local anesthetic showing activity slightly less than cocaine but with greatly reduced toxicity. The hydrochloride for pharmacological use can be prepared by dissolving 50 parts of the ether ester in 1000 parts of dry ether and then bubbling a stream of dry hydrogen chloride through the solution, the hydrogen chloride precipitating as a heavy white solid. After the ether is decanted off the crude hydrochloride can be washed with fresh dry ether and dried. A product is prepared which can be purified by crystallization from a mixture of chloroform and acetone and when so purified separates as a white relatively non-hydroscopic solid, melting at 169° C. and soluble in water.

Example 4

γ-Diethylaminopropyl-p-γ-diethylamino-Propoxymethyl benzoate
CH₃OCH₂—CH₂—CH₂—N(C₂H₅)₂

COOCH₂—CH₂—CH₂—N(C₂H₅)₂

23 parts of sodium are dissolved in 204 parts of γ-diethylaminopropanol and 500 parts of toluene added. Thereupon 95 parts of p-chloromethyl benzoyl chloride dissolved in 500 parts of toluene are gradually added to the alcoholate solution with vigorous agitation. The reaction mixture heats up and the precipitation of the sodium chloride begins. After it is complete, the reaction mixture is heated to the boiling point of toluene and refluxed for four hours or until no more solid precipitates.

The reaction mixture is then cooled, extracted with cold dilute hydrochloric acid, producing the hydrochloride. The acid extract is then treated with solid sodium carbonate to liberate the ether ester and extracted wtih ether. The ether extract is dried and the ether removed, and the residual liquid subject to fractional distillation at reduced pressure. Unchanged amino alcohol comes off at about 90° C. (20 mm.). Thereupon the pressure is lowered to 5 mm. and a straw colored oil distills over at 220-224° C. constituting the ether ester. The yield is in excess of 50% of the theory.

The product is a powerful local anesthetic having greater potency than cocaine and lower toxicity but is somewhat more irritating to corneal membranes.

Example 5

β-Diethylaminopropyl-p-β-diethylamino-Propoxymethyl benzoate

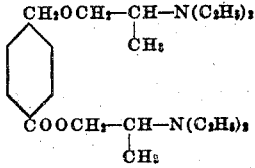

23 parts of sodium are dissolved in 204 parts of β-diethylaminopropanol and 500 parts of toluene added. 95 parts of p-chloromethyl benzoyl chloride dissolved in 500 parts of toluene are gradually added to the alcoholate solution. The reaction mixture heats up and after addition of all of the p-chloromethylbenzoyl chloride the mixture is refluxed until precipitation of sodium chloride ceases.

The reaction mixture is then cooled and extracted with cold dilute hydrochloric acid, forming a solution of the hydrochloride. This acid extract is then made alkaline with solid sodium carbonate and the ether ester liberated and extracted with ether. The ether extract, after drying and removing of the ether, is subjected to fractional distillation under reduced pressure. The first fraction to come over at about 70° C. (30 mm.) is unchanged amino alcohol. The pressure is then reduced to 4 mm. and a light yellow oil distills over at 208°–210° C. constituting the ether ester. The yield is in excess of 60%.

Example 6

β-Dibutylaminoethyl-p-β-dibutylamino-Ethoxymethyl benzoate

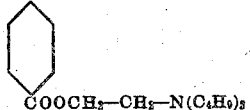

23 parts of sodium are dissolved in 260 parts of β-dibutylaminoethanol and 500 parts of toluene added. To this solution are gradually added 95 parts of p-chloromethylbenzoyl chloride dissolved in 500 parts of toluene. The reaction mixture is vigorously stirred during the addition, reaction starting immediately with evolution of heat and after the addition of all of the p-chloromethylbenzoyl chloride the reaction mixture refluxed until the precipitation of sodium chloride ceases.

The reaction mixture is then cooled and extracted with cold dilute hydrochloric acid to produce a solution of the hydrochloride. This solution is then made alkaline with solid sodium carbonates, liberating the ether ester and unchanged amino alcohol. Extraction with ether is then carried out, the ether extract dried and ether removed. The residual liquid is fractionally distilled under reduced pressure, unchanged β-dibutylaminoethanol coming over first at 90–95° C. (6 mm.) whereupon the pressure is lowered to 4 mm. and a light yellow oil comes over at 240–248° C. and after redistillation of this fraction the ether ester is obtained boiling at 242–245° C.

The hydrochloride may be produced as described above and the product is an effective local anesthetic having very low toxicity.

Example 7

γ-Dibuytlaminopropyl-p-γ-dibutylamino-Propoxymethyl benzoate

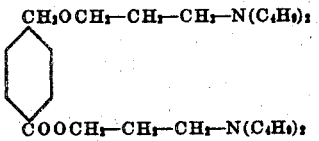

23 parts of sodium are dissolved in 285 parts of γ-dibutylaminopropanol to which 500 parts of toluene are added. To this solution is added gradually 95 parts of p-chloromethylbenzoyl chloride dissolved in 500 parts of toluene. The reaction mixture is stirred vigorously during the addition. The reaction starts immediately, the reaction mixture heats up and after addition of all of the chloromethylbenzoyl chloride the reaction mixture is refluxed until no more sodium chloride precipitates. The reaction mixture is then cooled and extracted with cold hydrochloric acid to produce a solution of the hydrochloride of the ether ester. This acid extract is then made alkaline with solid sodium carbonate to liberate the unreacted amino alcohol and the ether ester. Extraction with ether is then carried out, the ether extract dried and the ether removed. The residual mixture is fractionally distilled under reduced pressure. The unchanged dibutylaminopropanol comes over first at 100–105° C. (5 mm.) whereupon the vacuum is raised to about 3 mm. A yellow oil distills over at 250–255° C. and can be purified by redistillation giving a product distilling at 250–253° C. The product is a local anesthetic having greater potency than cocaine with lower toxicity but giving somewhat greater irritation.

In the foregoing examples the preparation of a hydrochloride is described as this is the simplest and commonest salt and is the one usually employed in practice. However, other salts may be prepared such as sulfates, citrates, borates and the like. The salts of the bases are therefore included in the invention and in fact the crude product obtained by extracting with dilute hydrochloric acid is the hydrochloride rather than the free base. Quaternary nitrogen salts may also be prepared such as for example the methiodides, ethobromides and the like.

We claim:

1. A dialkylamino alkyl ester of p-dialkylamino alkoxy methyl benzoic acid.

2. β-Dibutylaminoethyl-p-β - dibutylaminoethoxy-methyl benzoate.

3. γ-Dibutylaminopropyl-p - β - diethylaminoethoxymethyl benzoate.

4. γ-Dibutylaminopropyl - p - γ - dibutylaminopropoxy-methyl benzoate.

5. A tertiary alkamine ester of a para dialkylamino alkoxy methylbenzoic acid having the following formula:

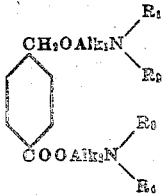

in which Alk₁ and Alk₂ are alkylene radicals and the pairs R₁, R₂, R₃, and R₄ are selected from the group consisting of alkyl radicals and a part of a saturated heterocyclic ring.

6. A salt of the ester of claim 2.

7. A salt of the ester of claim 3.
8. A salt of the ester of claim 4.
9. A salt of the ester of claim 5.

10. A method of preparing tertiary alkamine esters of p-tertiary alkamine alkoxymethylbenzoic acid which comprises reacting an alkyl ester of a p-tertiary alkaminealkoxymethylbenzoic acid with a tertiary amino alcohol in the presence of a metal alcoholate.

11. A method according to claim 10 in which the alkamine radicals are different.

12. A method of preparing γ-dibutylaminopropyl-p-β-diethylaminoethoxymethyl benzoate which comprises reacting an alkyl ester of p-β-diethylaminoethoxymethylbenzoic acid with γ-dibutylaminopropanol in the presence of a metal alcoholate.

VICTOR S. SALVIN.
ARTHUR J. HILL.